United States Patent

Ritter et al.

[11] Patent Number: 5,822,853
[45] Date of Patent: Oct. 20, 1998

[54] METHOD FOR MAKING CYLINDRICAL STRUCTURES WITH COOLING CHANNELS

[75] Inventors: Ann Melinda Ritter, Albany; John Raymond Hughes, Scotia; Melvin Robert Jackson, Niskayuna; Francis Lawrence Kirkpatrick, Galway; Francisco Jose Tenreiro Cunha, Clifton Park; Nesim Abuaf, Schenectady; Ronald Scott Bunker, Niskayuna, all of N.Y.

[73] Assignee: General Electric Company, Schenectady, N.Y.

[21] Appl. No.: 669,069

[22] Filed: Jun. 24, 1996

[51] Int. Cl.⁶ .................................................... B23P 15/00
[52] U.S. Cl. .................................. 29/890.01; 29/890.032
[58] Field of Search ..................... 29/890.01, 890.032, 29/557, 890.054, 889.721; 415/115; 60/752

[56] References Cited

U.S. PATENT DOCUMENTS

| | | | |
|---|---|---|---|
| 3,595,025 | 7/1971 | Stockel | 29/890.01 |
| 4,584,171 | 4/1986 | Niino et al. | 29/890.01 |
| 5,075,966 | 12/1991 | Mantkowski | 29/890.01 |
| 5,120,192 | 6/1992 | Ayase et al. | |
| 5,249,357 | 10/1993 | Holmes et al. | 29/890.01 |
| 5,427,736 | 6/1995 | Ritter et al. | |
| 5,480,468 | 1/1996 | Ritter et al. | |
| 5,613,299 | 3/1997 | Ring et al. | 60/257 |

OTHER PUBLICATIONS

"Advanced Cooled First Stage Vane Design," Levari et al., ASME Journal, pp. 1–11.

*Primary Examiner*—Irene Cuda
*Attorney, Agent, or Firm*—Ernest G. Cusick; Noreen C. Johnson

[57] ABSTRACT

Methods of making cylindrical structures with cooling channels, such as, for example, combustor/transition pieces for gas turbines having a double wall with a plurality of cooling channels, both axially and, in some cases, circumferential cross-flow passages positioned between the structure's inner member and the outer member to provide cooling air thereto, are disclosed. The cooling channels are formed in the area between the inner member of the structure and the outer member thereof. The passages preferably extend both axially and circumferentially with respect to the direction of flow through the structure. The axial passages extend completely from one end to the other and the circumferential passages extend around the circumference of the structure.

37 Claims, 10 Drawing Sheets

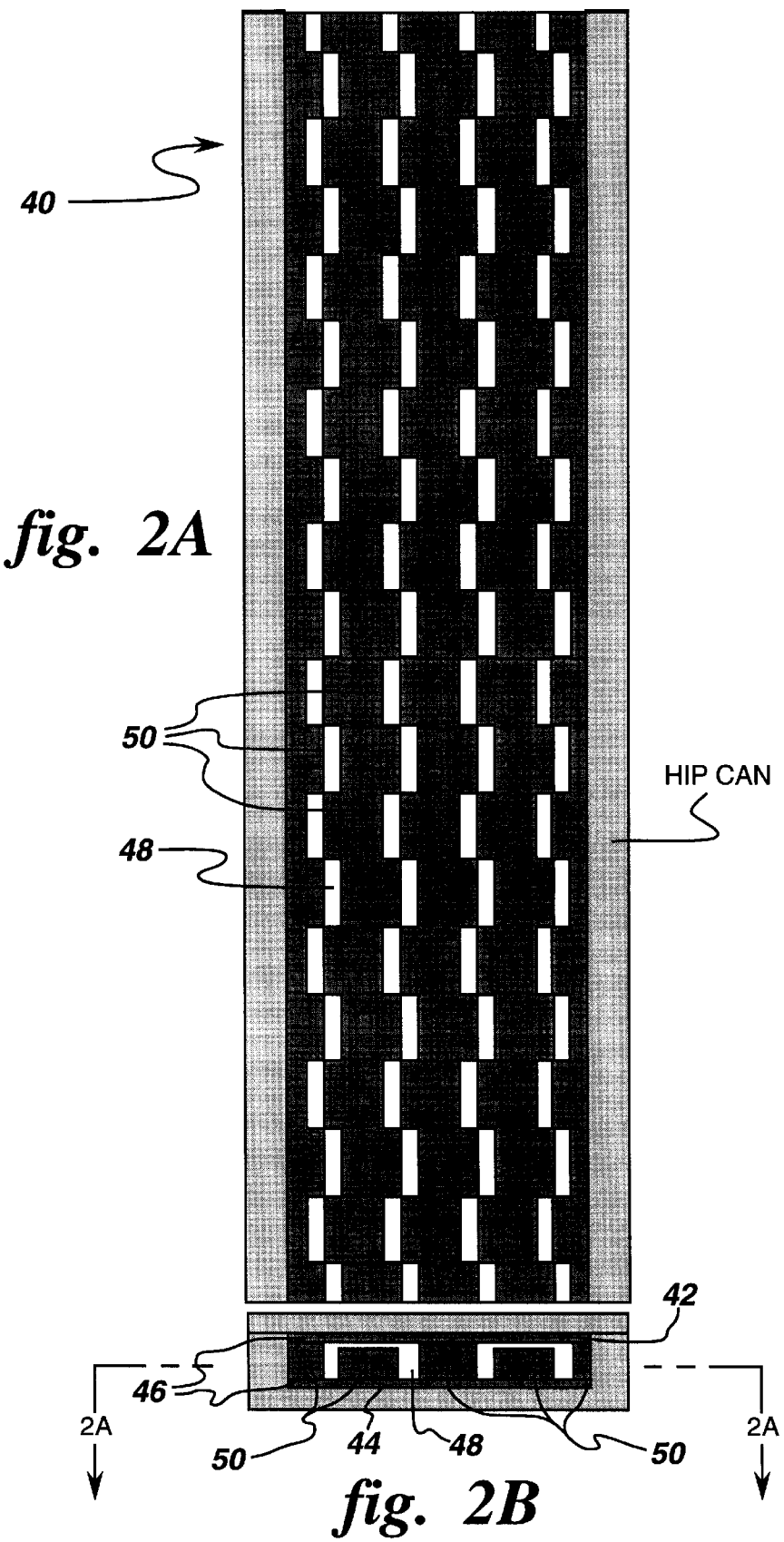

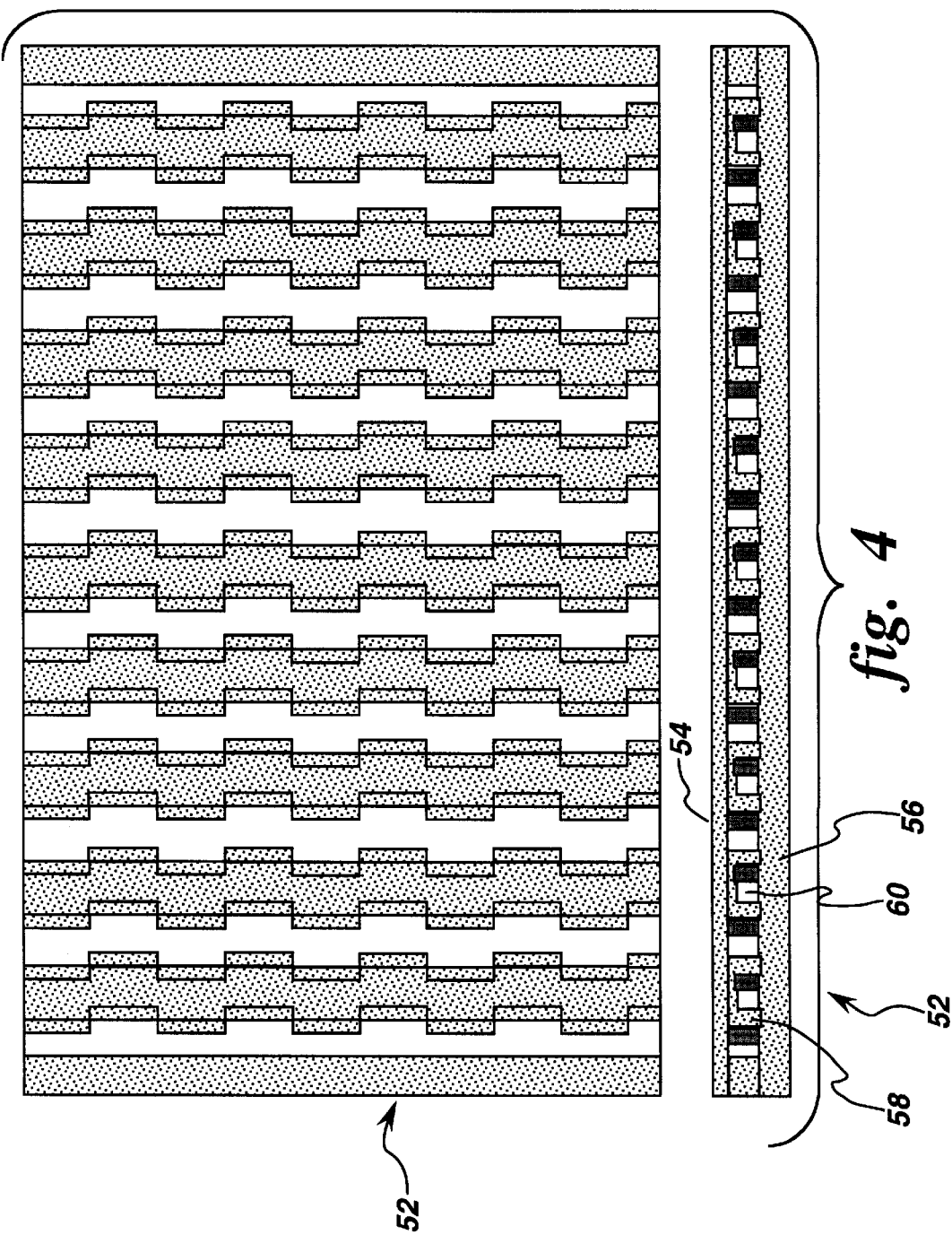

METHOD FOR MAKING CYLINDRICAL STRUCTURES WITH COOLING CHANNELS

RELATED APPLICATIONS

This application is related to commonly assigned U.S. patent application Ser. No. 08/627,807, filed Apr. 10, 1996, of Ritter et al. now U.S. Pat. No. 5,724,816 and U.S. patent application Ser. No. 08/669,070, filed Jun. 24, 1996, of Jackson et al., the disclosure of each is herein incorporated by reference.

BACKGROUND OF THE INVENTION

This invention generally relates to methods for making cylindrical structures having cooling channels, more particularly relates to methods of making gas turbine combustors and/or transition pieces having cooling channels and most particularly relates to methods for making improved combustors and/or transition pieces having cooling channels for utilization where film cooling may be extremely limited or might not even be possible.

Traditional gas turbine combustors use diffusion (i.e., nonpremixed) flames in which fuel and air enter the combustion chamber separately. The process of mixing and burning produces flame temperatures exceeding 3900 degrees F. Since conventional combustors and/or transition pieces having liners are generally capable of withstanding for about ten thousand hours (10,000) a maximum temperature on the order of only about 1500 degrees F., steps to protect the combustor and/or transition piece liners must be taken. This has typically been done by film-cooling which involves introducing the relatively cool compressor air into a plenum surrounding the outside of the combustor. In this prior arrangement, the air from the plenum passes through louvers in the combustor liner and then passes as a film over the inner surface of the combustor liner, thereby maintaining combustor liner integrity.

Because diatomic nitrogen rapidly disassociates at temperatures exceeding about 3000° F. (about 1650° C.), the high temperatures of diffusion combustion result in relatively large $NO_x$ emissions. One approach to reducing $NO_x$ emissions has been to premix the maximum possible amount of compressor air with fuel. The resulting lean premixed combustion produces cooler flame temperatures and thus lower $NO_x$ emissions. Although lean premixed combustion is cooler than diffusion combustion, the flame temperature is still too hot for prior conventional combustor liners to withstand.

Furthermore, because the advanced combustors premix the maximum possible amount of air with the fuel for $NO_x$ reduction, little or no cooling air is available making film-cooling of the combustor liner impossible. Thus, means such as thermal barrier coating in conjunction with "backside" cooling have been considered to protect the combustor liner from destruction by such high heat. Backside cooling involved passing the compressor air over the outer surface of the combustor liner prior to premixing the air with the fuel.

Lean premixed combustion reduces $NO_x$ emissions by producing lower flame temperatures. However, the lower temperatures, particularly along the inner surface or wall of the combustor liner, tend to quench oxidation of carbon monoxide and unburned hydrocarbons and lead to unacceptable emissions of these species. To oxidize carbon monoxide and unburned hydrocarbons, a liner would require a thermal barrier coating of extreme thickness (50–100 mils) so that the surface temperature could be high enough to ensure complete burnout of carbon monoxide and unburned hydrocarbons. This would be approximately 1800–2000 degrees F. bond coat temperature and approximately 2200 degrees F. TBC (Thermal Barrier Coating) temperature for combustors of typical lengths and flow conditions. However, such thermal barrier coating thicknesses and temperatures for typical gas turbine component lifetimes are beyond current materials known capabilities. Known thermal barrier coatings degrade in unacceptably short times at these temperatures and such thick coatings are susceptible to spallation.

Advanced cooling concepts now under development require the fabrication of complicated cooling channels in thin-walled structures. The more complex these structures are, the more difficult they are to make using conventional techniques, such as casting. Because these structures have complexity and wall dimensions that may be beyond the castability range of advanced superalloys, and which may exceed the capabilities of the fragile ceramic cores used in casting, both in terms of breakage and distortion, new methods of fabricating must be developed to overcome these prior limitations. Possible geometries for enhanced cooling are disclosed in Docket No. 51DV5608, the disclosure of which is incorporated herein by reference.

Because the accuracy of placement of cooling features and wall thicknesses is much greater than for ceramic-cored castings, the powder foil process, described in U.S. Pat. Nos. 5,427,736 and 5,480,468, the disclosure of each is herein incorporated by reference, may provide for greatly reduced tolerances on wall thicknesses. These capabilities are also of interest in fabricating components other than airfoils, such as combustors, which can be cylindrical, and more irregularly shaped components such as transition pieces. In those kinds of structures, wrought alloys may be used, with considerable brazing and/or welding of cooling features (such as impingement sleeves) being required. Accuracy of placement of such cooling features, and retention of mechanical behavior of strong superalloys and avoidance of structural damage during welding, may be a severe limitation to materials that can be considered.

More efficient cooling structures may allow significant cooling flow reduction, perhaps up to 60%, without increasing the metal temperature. These reductions may also be realized with a combination of new cooling structures and other system/cycle changes.

Accordingly, there is a need for new methods of making cylindrical structures with cooling channels which can withstand combustion temperatures without film-cooling and yet maintain flame stability and burn out carbon monoxide and unburned hydrocarbons, such as advanced cooling concepts for low-emissions-combustors and transition pieces (particularly $NO_x$ emissions). Such structures, for example, combustor/transition pieces, should provide cooling channels in thin-walled structures which allow the inner surface of the combustor/transition piece to maintain reasonable metal temperatures. Efficient cooling combustor/transition piece structures should provide cooling flow reduction of about thirty-five percent (35%) to about sixty percent (60%) without increasing the metal temperature of the inner surface of the combustor and should have internal features such as turbulation promoters which must have sharper internal edges than can be currently produced by casting. Because the accuracy of placement of cooling features and wall thicknesses can be much greater than for ceramic-cored castings, utilizing a powder foil process should provide for greatly reduced tolerances on wall thicknesses, and should also provide for the production of sharp-edged internal features.

SUMMARY OF THE INVENTION

In carrying out the present invention in preferred forms thereof, we provide methods for making double-wall structures having integral internal channels, comprising the steps of: assembling a double-wall assembly comprising an inner wall, a channel forming means, a sacrificial channel filling means and an outer wall, wherein the inner wall and the outer wall are complementary to one another and separated by the channel forming means that is placed between and in touching contact with them to define at least one channel, and wherein the sacrificial channel filling means is complementary to the channel forming means and placed into the channel forming means to fill the at least one channel, such that the double-wall assembly comprises a substantially solid structure; hot pressing the double-wall assembly at a temperature and for a time sufficient to cause the inner wall, outer wall and channel forming means to become metallurgically bonded to one another; and removing the sacrificial channel filling means.

Using a specific method of the present invention, a ring with complex internal cooling channels running circumferentially has been produced by hot-rolling a HIP preform, followed by cold ring-rolling and chemical removal of sacrificial materials used to maintain the cooling channel locations during metal deformation.

Using a specific method of the present invention, panels with complex internal cooling channels, as well as straight-through channels, have been produced by HIP of an array of stainless steel channels with sacrificial cores.

Other objects and advantages of the present invention will become apparent from the following description, the accompanying drawings and the appended claims.

BRIEF DESCRIPTION OF THE DRAWINGS

FIG. 2 is a cross section of a HIP'ed plate preform according to one method of the present invention;

FIG. 4 is a view of a stainless steel demonstration panel having enhanced cooling flow made in accordance with one method of the present invention;

DETAILED DESCRIPTION OF THE INVENTION

Figure 1:
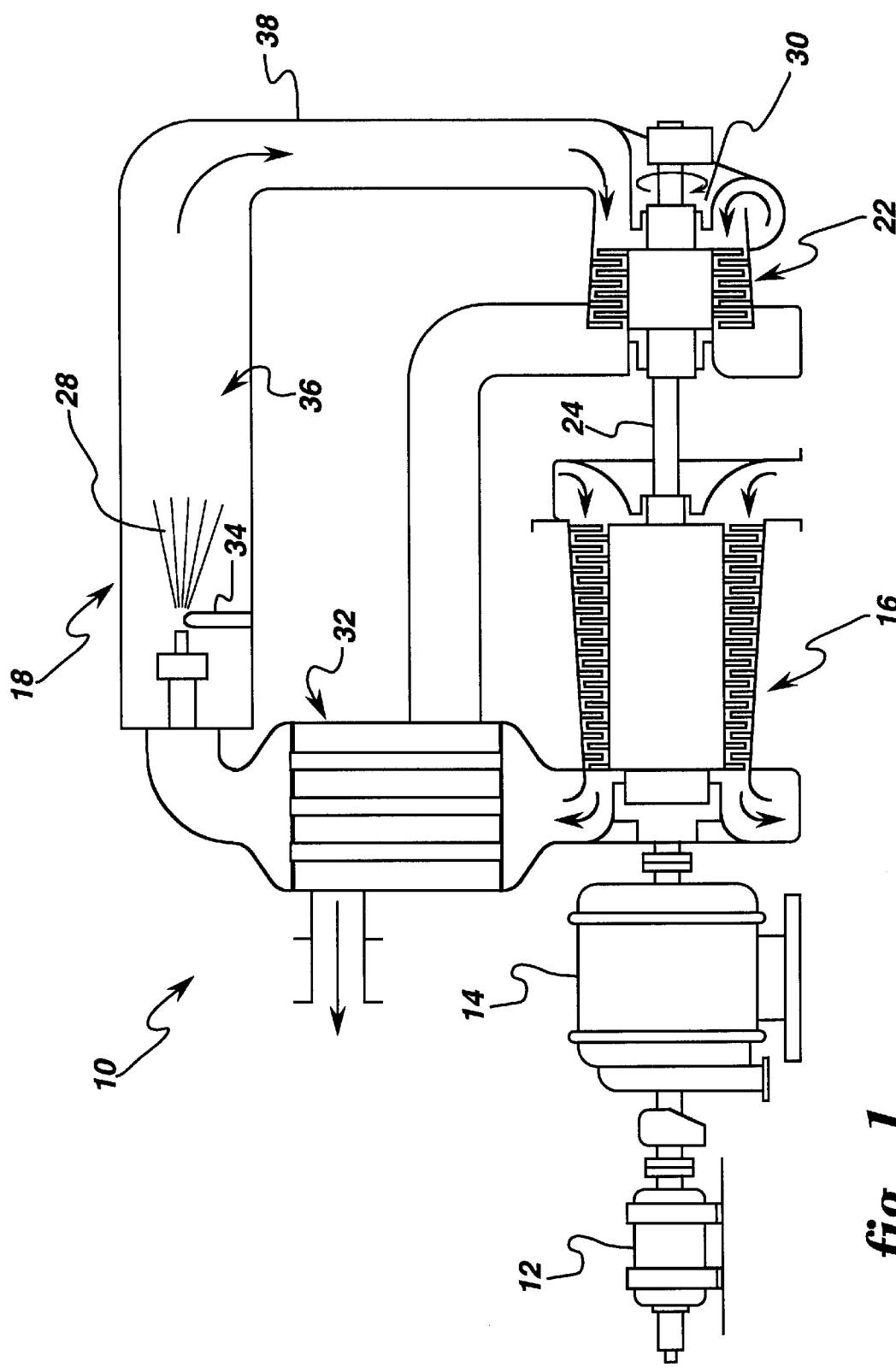
FIG. 1 is a schematic representation of a representative gas turbine.

FIG. 1 schematically Illustrates a gas turbine system 10. In operation, typical gas turbines 10 are driven by the combustion gases from fuels, in that a flowing medium with a high energy content, i.e., the combustion gases, produces a rotary motion as a result of being deflected by rings of blading mounted on a rotor. In operation, the compressor 16 draws in fresh air and compresses it to a representative pressure on the order of about 50–75 lb/in$^2$; the air is forced by the compressor 16 through a heat exchanger 32 where it is preheated by the heat that is still present in the exhaust combustion gases emerging from the turbine section 22; and finally, the preheated air is admitted into the combustion chamber of the combustion section 18. In the combustion chamber, fuel is burned, thereby producing gases with a temperature of about 1500° C. or about 2730° F. These combustion gases flow at a high velocity into turbine section 22 and drive it.

As shown, the turbine 22 itself, the compressor 16 and the electric generator 14 are all mounted on a single shaft 24. As is well known, the turbine cannot transmit its entire power output to the generator, for a substantial portion is needed for driving the compressor 16. The turbine section 22 is started with the aid of the electric motor 12 which first has to set the compressor in motion in order to produce compressed air and supply it to the combustion chamber so as to enable the combustion gases to be formed. Only then can the turbine start running.

As schematically shown in FIG. 1, the combustion section 18, which includes the combustion chamber 36 provides for the flow of the combustion gas 28 from the combustion section 18 to the turbine inlet 30. A transition piece 38 connects the turbine inlet and the combustion section 18.

In the construction of combustors or combustor sections and transition pieces, where the temperature of the combustion gases is about or exceeds about 1500° C., there are no known materials which can survive such a high intensity heat environment without some form of cooling.

As stated in the background of the invention, the cooling of the various components of a gas turbine coupled with the requirement to reduce the $NO_x$ emissions has led to development of new manufacturing methods for the fabrication of various gas turbine components.

These new methods include, for example, methods for making double-wall structures having integral internal channels such as assembling a double-wall assembly comprising an inner wall, a channel forming means, a sacrificial channel filling means and an outer wall, wherein the inner wall and the outer wall are complementary to one another and separated by the channel forming means that is placed between and in touching contact with them to define at least one channel, and wherein the sacrificial channel filling means is complementary to the channel forming means and placed into the channel forming means to fill the at least one channel, such that the double-wall assembly comprises a substantially solid structure; hot pressing the double-wall assembly at a temperature and for a time sufficient to cause the inner wall, outer wall and channel forming means to become metallurgically bonded to one another; and removing the sacrificial channel filling means.

The outer wall material used in these methods could be selected from the group consisting of: stainless steel, Ni-base alloys, Co-base alloys, Fe-base alloys, Ti-base alloys, Cr-base or composite alloys, FeCrAlY-W alloys and Nb-base alloys.

The inner wall material used in these methods could be selected from the group consisting of: stainless steel, Ni-base alloys, Co-base alloys, Fe-base alloys, Ti-base alloys, Cr-base or composite alloys, FeCrAlY-W alloys and Nb-base alloys.

The channel forming means used in these methods could be selected from the group consisting of: stainless steels, Ni-base alloys, Co-base alloys, Fe-base alloys, Ti-base alloys and Nb-base alloys.

The channel filling means used in these methods could be selected from the group consisting of: alloys comprising Ni and Cu, graphite, carbon steel, other carbonaceous materials, and including a glass or a salt that might be solid at the HIPing temp. and etched afterward.

The hot pressing used in these methods includes hot isostatic pressing and specifically canning the double-wall assembly and evacuating the canned assembly prior to hot pressing. The hot pressing step could also include powder compaction.

The channel filling means used in these methods could be accomplished by using a removal method selected from the group consisting of: chemical etching of the channel filling means, pyrolysis of the channel filling means, melting of the channel filling means and expulsion of the melt.

The method of removing the channel filling means used in these methods could be accomplished by using a removal method selected from the group consisting of: dissolution of the channel filling means in a liquid not aggressive with respect to the wall channel materials.

The channel forming means used in these methods includes a single article having at least one channel formed therein.

The at least one channel used in these methods has, in some applications, at least one stepwise offset for promoting turbulent fluid flow through the channel.

The channel forming means used in these methods includes a plurality of components that communicate with one another to form the at least one channel.

One method used further comprises the step of creating a plurality of bores that extend through the inner wall into the at least one channel prior to the step of assembling the double-wall assembly, wherein the double-wall assembly also comprises a bore filling means that is inserted into the bore during the assembling step.

One method used further comprises the step of creating a plurality of bores that extend through the inner wall into the at least one channel after hot pressing and prior to removing the channel filling means.

One method further comprises the step of: creating a plurality of bores that extend through the inner wall into the at least one channel after said removing of the channel filling means.

As was stated above, in situations where film cooling is not possible or not a viable option, combustors and transition pieces fabricated with cooling channels between hot wall and cold wall surfaces have enhanced heat transfer to provide the necessary cooling. Such combustors and transition pieces can be fabricated according to the methods described in the examples below.

EXAMPLE 1

Figure 7:
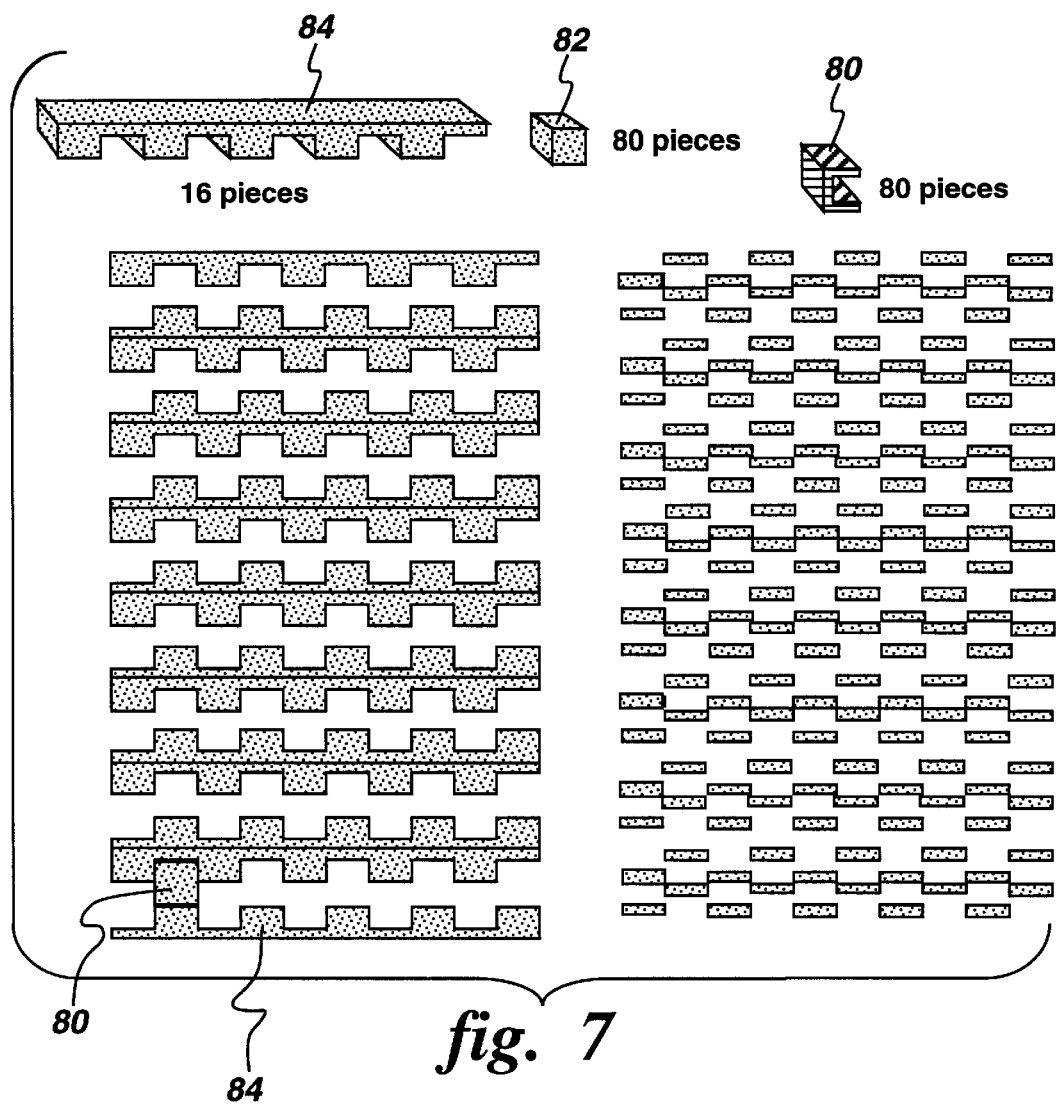
FIG. 7 is a view of an original powder foil structure containing 80 stainless steel "U" channels supported in HIP'ing by 80 cold rolled steel blocks, separated by the 16 cold rolled steel grooved sections.
Figure 7A:
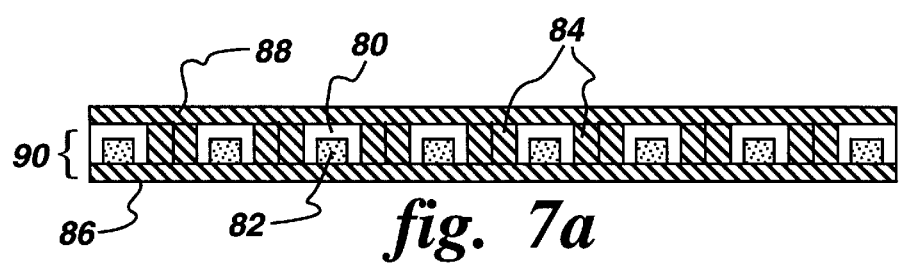
Figure 7B:
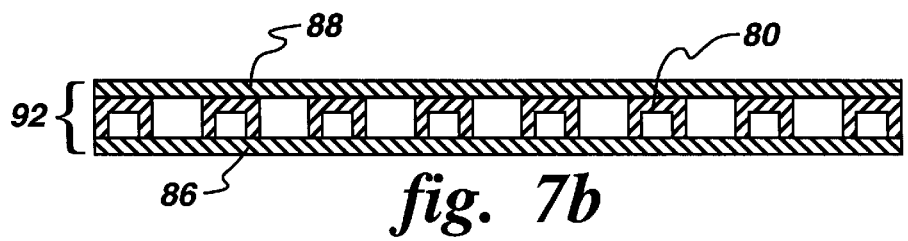

A first panel 92, FIG. 7, about 1¼ inches×about 3½ inches, was fabricated. The stainless steel channel geometry was similar to the examples below, and the sacrificial pieces were made from low carbon steel instead of monel, as with the examples below. The bottom wall 86 was made from a plate of stainless steel, as below. However, the top wall 88 was made using a powder foil approach. This method had been used to make foils from high-strength alloys.

For this panel 92, an about 0.02 inch thick stainless steel foil was tack-welded over the steel channel assembly 90, and was placed in a HIP can, leaving a gap between the steel foil and the HIP can wall. The assembly 90 consisted of the pieces 80, 82, 84 and 86. This gap was then filled with NiCrAlY powder, which during HIP consolidated into an about 0.02 inch thick top wall 88 on the stainless steel channel assembly. As with the panels below, the HIP can and the sacrificial pieces 82, 84 were etched away after being HIP'ed. The original powder foil structure contained eighty (80) stainless steel "U" channels 80 supported in HIPing by eighty (80) cold rolled steel blocks 82 (see FIG. 7), separated by the sixteen (16) cold rolled steel grooved sections 84. These pieces were assembled on 0.02 inch stainless foil, and HIP'ed with Ni alloy powder on the opposite face to make a 0.02 inch outer wall. After etching to remove the steel, the space between stainless and Ni alloy outer walls 86,88 consisted of vertical stainless partitions in the pattern shown in FIG. 7.

This first panel demonstrates the capability of the process to tailor the compositions of different sections to different thermal or mechanical requirements.

EXAMPLE 2

An about 6.44 inch×about 4.14 inch panel 52 with zig-zag cooling channels was HIP-fabricated from 304 stainless steel. The internal structure of the panel after HIP are shown in FIG. 4. The panel 52 consisted of stainless steel top 54 and bottom 56 plates, about 1/16 inch and about 3/16 inch thick, respectively. The stainless steel U-channels 58 had top walls about 0.040 inches thick and side walls about 0.080 inches thick. The channels were about 0.410 inch wide, and the side-to-side opening was about 0.250 inches. The top-to-bottom opening 60 within the channels was about 0.160 inches. The spacing between the channels was about 0.250 inches, and the top-to-bottom dimension between the channels was about 0.200 inches.

In constructing the panel 52, the channels 58 were fitted tightly over sacrificial monel pieces (not shown), which were also zig-zagged in a manner similar to pieces 84 in example 1. The entire assembly was placed in a cold-rolled steel HIP can, and evacuated.

After HIP at about 15 ksi and about 1150° C., the can and the sacrificial monel pieces were removed by etching in a solution of about forty five percent (45%) nitric acid/about five percent (5%) sulfuric acid/about fifty percent (50%) water. A series of about 0.060 inch diameter holes (62 in FIG. 5) for impingement cooling were then drilled through the bottom plate 56 of the stainless assembly. The holes did not touch the thin side, or the inner cooling channel walls.

Figure 5:
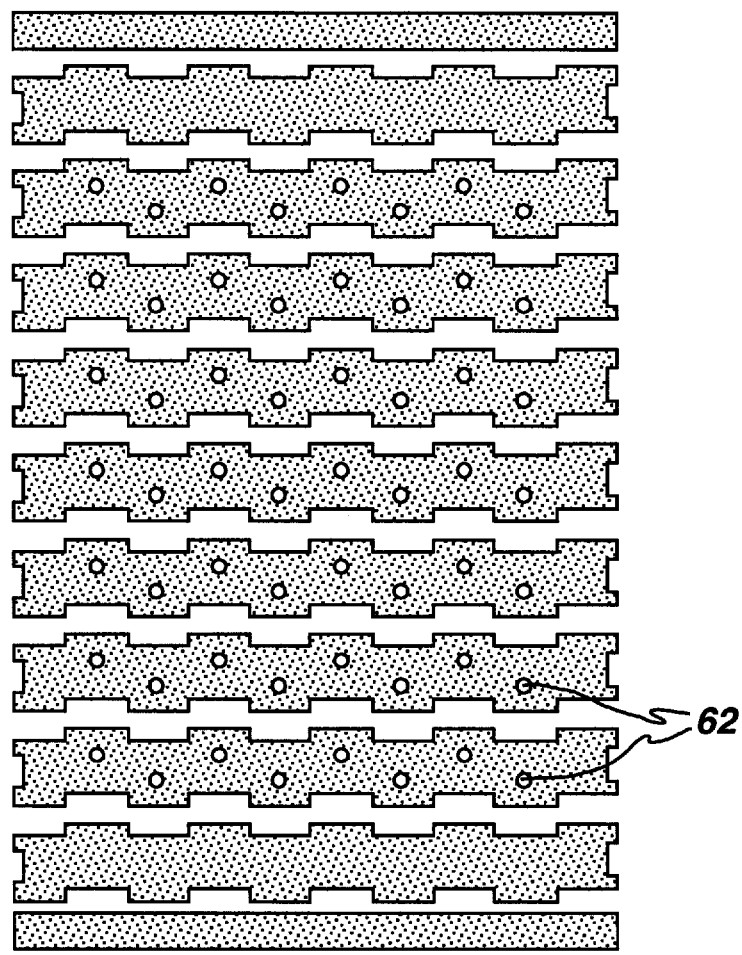
FIG. 5 is an X-radiographic image of HIP'ed and etched stainless steel enhanced cooling flow demonstration panel at 0.75X of FIG. 4.

An x-ray image of the drilled panel, FIG. 5, illustrates the positions of the drilled holes 62 relative to the cooling channels and the walls. There are also holes that are not imaged in the 6 central channels that appear white in FIG. 5.

Figure 6:
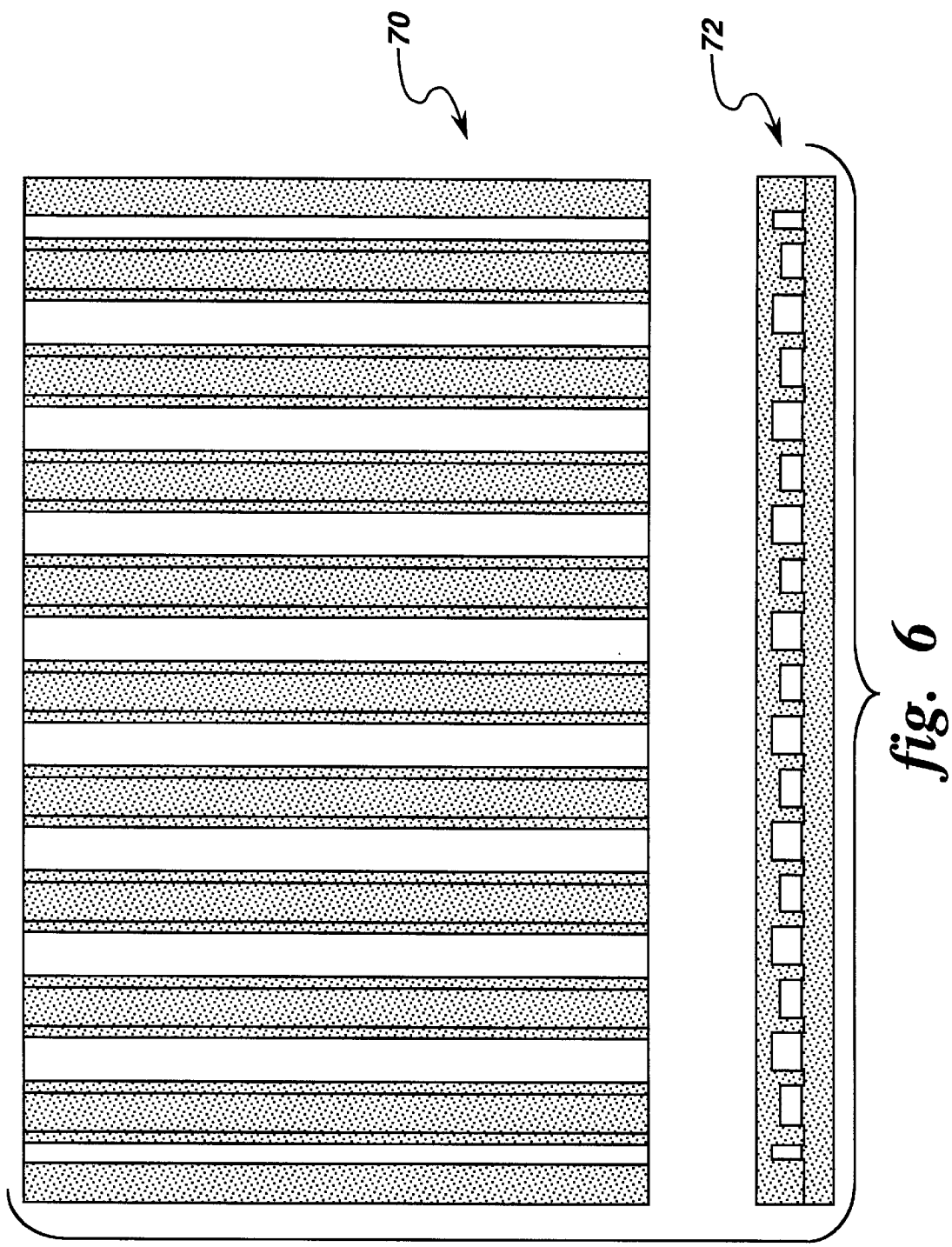
FIG. 6 is a view of a panel having straight-through cooling flow for comparison with the enhanced cooling flow demonstration panel of FIG. 4.
Figure 8:
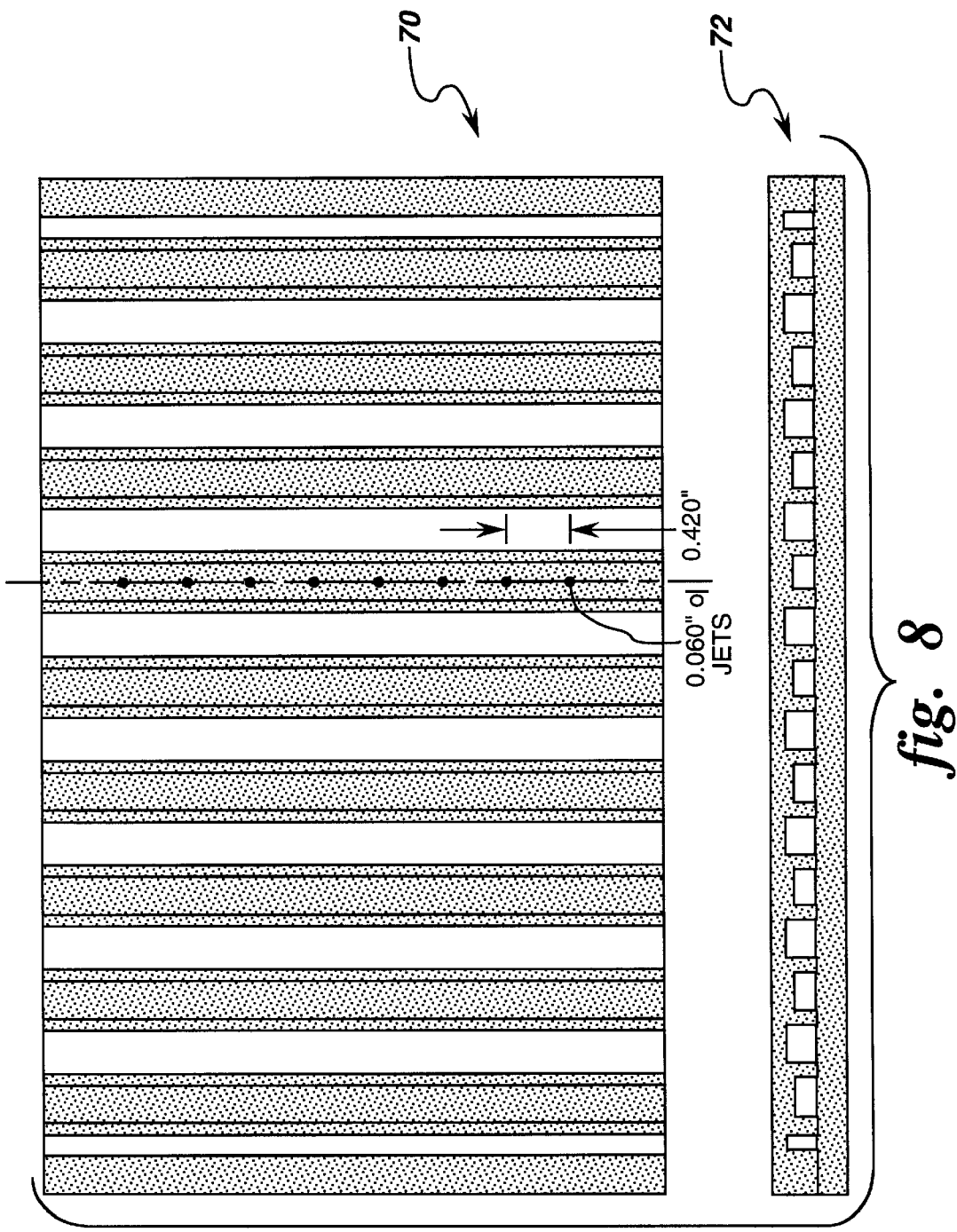
FIG. 8 is a panel for straight through cooling flow having a hole drilling pattern for enhanced cooling flow for comparison with the enhanced cooling flow demonstration unit of FIG. 9.

A panel of the same size and wall thicknesses with straight-through cooling channels FIG. 6) was also fabricated using this technique, and then drilled with holes to produce the panel in FIG. 8.

The two panels were then evaluated in heat transfer tests described below. Data from these panels indicated that their performance was essentially similar. However, compared with plain impingement cooling, heat transfer performance was improved by about twenty-two (22%) to about twenty-eight (28%) at low Reynolds number conditions, and about ten percent (10%) to about eighteen (18%) at high Reynolds number conditions.

The purpose of the tests of the two panels was to evaluate the heat transfer performance of two cooling geometries, both characterized as impingement channels. Such channels are comprised of coolant flow tubes or channels, whether straight or serpentined in some manner, which are fed by impingement jets through one wall. The objective of such channels is to take advantage of the high heat transfer performance associated with impingement, but in a manner which allows the directing of the flow according to cooling needs. Ideally, a happy marriage of impingement and convective duct heat transfer would result which is superior to either impingement or duct heat transfer on their own. Additionally, geometric configurations might be discerned which further enhanced convective heat transfer through the use of transverse roughness elements, jagged serpentines, or other means. The determination of an optimal configuration however, depends upon the many factors of impingement, those of convection, as well as those occurring through the interaction of the two.

Figure 9:
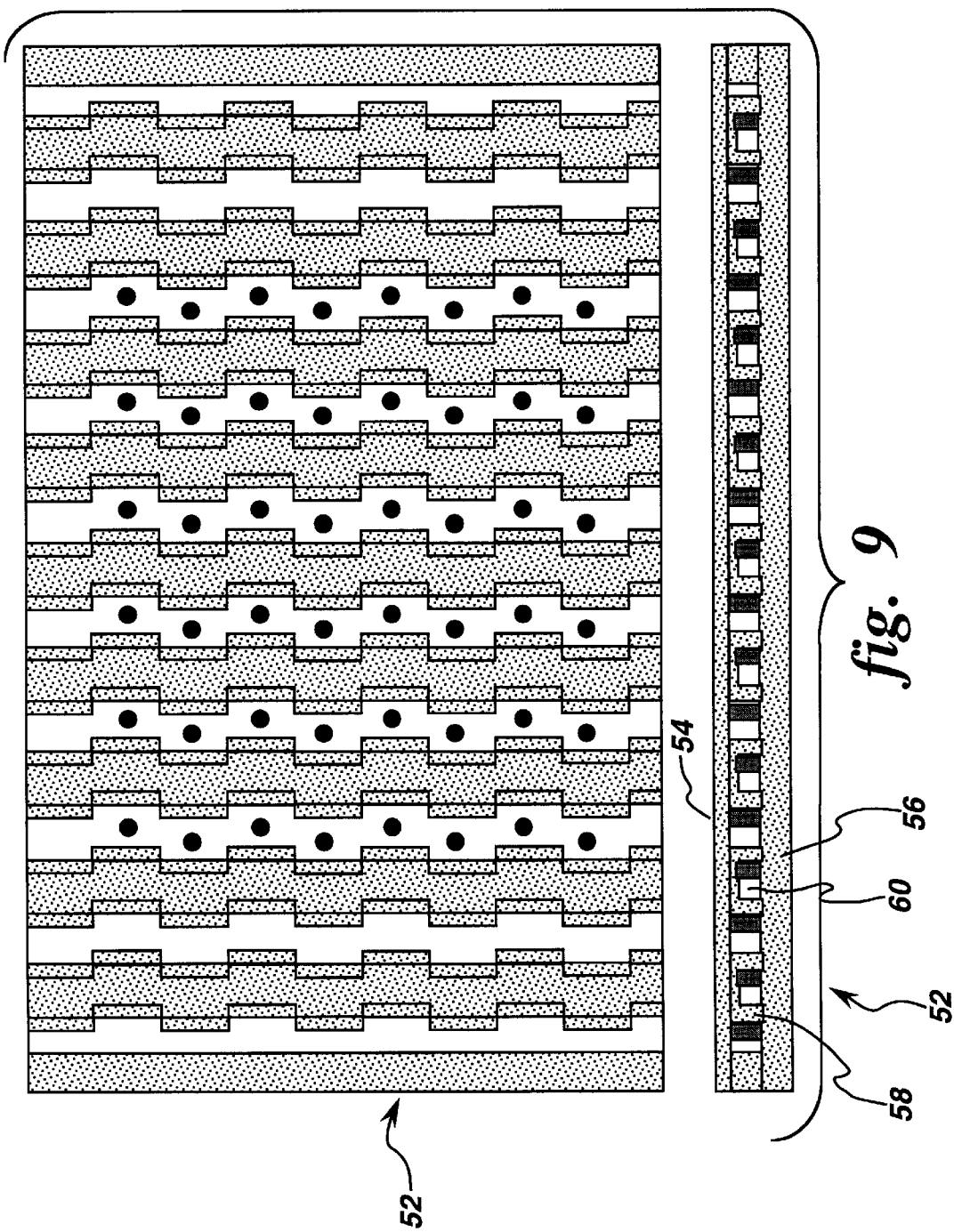
FIG. 9 is a panel for enhanced cooling flow with a zig zag pattern.

The tests involved the two panels 70 and 52 described above. The baseline panel 70 shown in FIG. 8 is formed of straight channels with regularly spaced impingement jets along the channel centerlines. The second panel 52 is a serpentine, called the zig-zag channel, as shown in FIG. 9. In FIG. 9, the impingement jets have the same spacing and size, as in FIG. 8, but are offset relative to the centerlines. These units, with the dimensions indicated in the figures, were tested for overall heat transfer performance, as well as pressure drop. The results from these tests are compared, and also compared to plain impingement case of parallel plates without connecting ribs.

Test Setup

Figure 10:
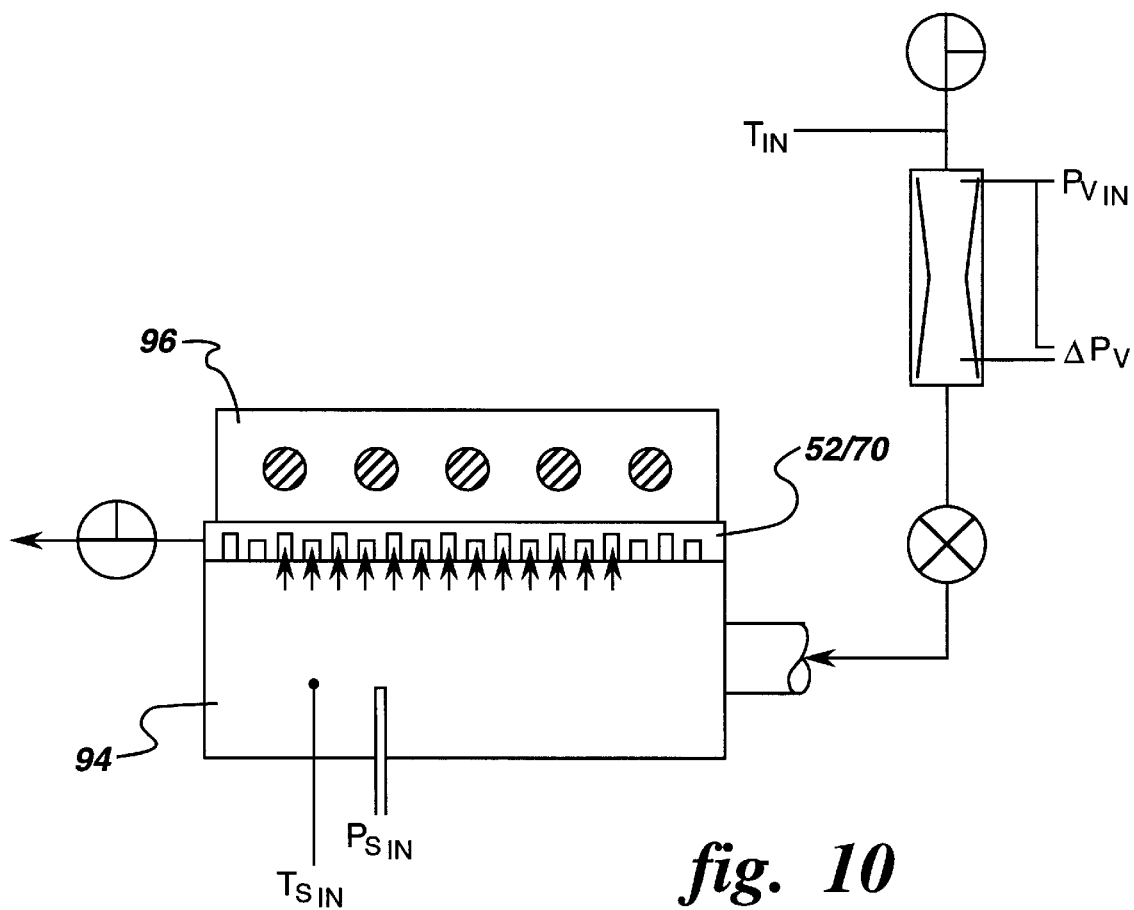
FIG. 10 is a detailed schematic representation of the test setup for testing of the cooling units of FIGS. 8 and 9 and FIG. 11 is a perspective view of the detailed schematic representation of the test setup for testing of the cooling units of FIGS. 8 and 9.
Figure 11:
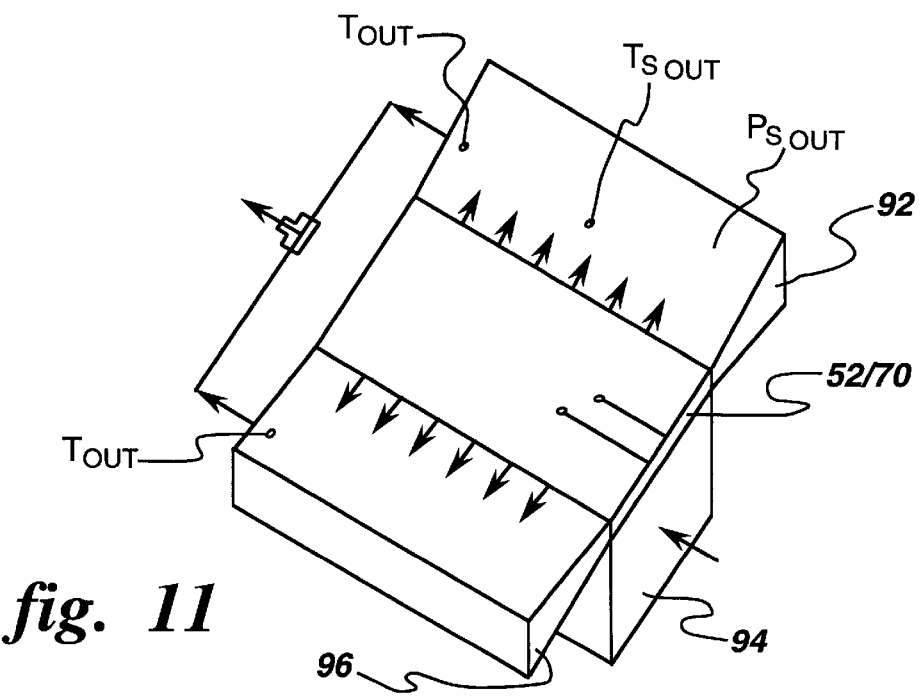

FIGS. 10 and 11 show the test setup used for each unit. Moderate pressure air was supplied by a Worthington compressor at about 75 psig and about 70° F. to the flow venturi. The flow rate was determined from the in-line venturi measurements of inlet pressure, differential pressure, and temperature. Test section flow and pressure control was established with the use of three manual valves, a ball valve upstream of the venturi, a needle valve downstream of the venturi, and a ball valve downstream of the test section exit.

Each panel 52, 70 has an array of 13×8 jets, that is, 8 jets equally spaced in each of the central 13 channels; the other channels do not flow in the tests. The panels 52, 70 were fitted with inlet 94 and exit 96 plenums in identical fashion, as in FIG. 11. The inlet plenum 94 was large enough to ensure a uniform distribution of air to all impingement jets. The exit plenums 96 were flared out (expanded) from the channel exits to minimize non-uniform flow distribution due to back pressure. Temperature and static pressure were measured in the inlet plenum 94 and one exit plenum 96 (assuming symmetric flow to the two exits). Additional thermocouples were placed at each exit plenum 96 exit.

The impingement surface (plate) of each test section had two thermocouples securely tacked into machined grooves. One thermocouple was intended to be located over a flow channel, while the other was over a separating rib. Heat input to the impingement surface was via a thick copper block, having five compact heating rods imbedded in it. The maximum heat rate of the unit was about 7170 btu/hr (2100 W). The Cu block temperature was also monitored. Thermal contact between the Cu and the stainless steel test surface was facilitated by thermal grease and vise clamps. The entire assembly was wrapped with insulation.

Test Conditions

Table 1 shows the initial test matrix range planned for these units. For various jet Re, this table gives an Indication of the associated impingement pressure ratios and pressure differentials involved.

TABLE 1

Initial Test Matrix for Channel Units

The following matrix contains approximate numbers. The criteria used to establish these ranges were 1) maintaining an impingement pressure ratio $P_{rat}$ of 1.10 or less, and 2) keeping the jet Mach number in the incompressible range of $M_j$ less than or equal to 0.30. These criteria are to keep the tests within the representative range to unit the actual hardware. Inlet temperature of 530R has been assumed. The total mass flow rate through the unit is based on an array of .060" diameter impingement holes of 13 × 8, assuming an average discharge coefficient of 0.8, using air as the fluid.

| Inlet $P_s$ psia | Post-Imp.Pe psia | Delta-P psid | $P_{rat}$ | Rho lbm/ft3 | Gj lbm/ft2/s | Rej | m lbm/s |
|---|---|---|---|---|---|---|---|
| 16.2 | 14.7 | 1.5 | 1.10 | .0825 | 27.0 | 11000 | .042 |
| 32.4 | 29.4 | 3.0 | 1.10 | .165 | 54.3 | 22000 | .085 |
|  | 30.9 | 1.5 | 1.05 |  | 38.4 | 15600 | 0.60 |
|  | 31.4 | 1.0 | 1.03 |  | 31.4 | 12700 | .049 |
| 60.0 | 54.8 | 5.3 | 1.09 | .306 | 97.5 | 40000 | .199 |
|  | 57.0 | 3.0 | 1.05 |  | 73.0 | 30000 | .149 |
|  | 58.5 | 1.5 | 1.03 |  | 51.0 | 21000 | .105 |
| 79.7 | 71.8 | 7.9 | 1.11 | .406 | 138.0 | 56600 | .282 |
|  | 74.7 | 5.0 | 1.07 |  | 110.0 | 45000 | .224 |
|  | 76.7 | 3.0 | 1.04 |  | 85.3 | 35000 | .174 |
|  | 78.2 | 1.5 | 1.02 |  | 60.9 | 25000 | .125 |

The estimated design point for steam cooling at 600 psia and 850° F., with $P_{rat}$ of 1.015 is Rej = 56600 and Gj = 207 lbm/ft2/sec (this is based on an impingement pressure drop of 9 psid).

Testing was limited to one inlet pressure, about 63 psia. For each unit, tests were performed at three Re numbers, with three different heat rates. The three Re cases are very similar to those shown in Table 1 at the 60 psia level. The heat rates were generally at levels of 1700, 2700, and 4400 btu/hr (500, 800, and 1300 W). All of this set of tests were run to obtain steady-state conditions of both fluid and metal temperatures for given flow rates and heat rates.

Parallel Plate Impingement Performance

These estimates were performed on the basis of the correlation provided by Florschuetz, Truman, and Metzger, 1981, "Streamwise Flow and Heat Transfer Distributions for Jet Array Impingement with Crossflow", *Journal of Heat Transfer*, Vol. 103, pp. 337–342. This research was for jet arrays, not jets within channels, both in-line and staggered. These estimates provide a "non-enhanced" impingement heat transfer for comparison to the impingement channels tested.

For the channel geometry of the present tests, $d=0.060"x/d=7y/d=4.17(z/d)_{ave}=3Pr=0.68$ The first jet $Nu_1$, that where $G_c=0$, is $Nu_1=0.0641 Rej^{0.727}$, and the subsequent jets are $Nud=Nu_1[1-0.684(GC/Gj)^{0.561}]$ for in-line array and $Nud=Nu_1[1-0.969(GC/Gj)^{O.660}]$ for staggered array For the current geometries, the maximum crossflow factor is about Gc/Gj=0.22 giving an average Nu over the four jet flow region of $$Nu_{ave} = 0.829 \, Nu_l \text{ in-line} \quad (1)$$

$$Nu_{ave} = 0.799 \, Nu_l \text{ staggered} \quad (2)$$

In the current tests the active surface area, taken as the heater area present over active cooling channels, is about 0.107 ft$^2$. The summary of Table 2 shows heat transfer coefficients of Eq.(2) and heat rates for a range of Re and three different wall-to-fluid temperature potentials, all for a coolant supply at 70° F. Note that this correlation is based on use of adiabatic wall temperatures, not jet inlet temperatures.

TABLE 2

Heat Rate and Nusselt Number Estimates for Parallel Plates

| $Re_j$ | $Nu_{ave}$ | $h_{ave}$ btu/hr/ft2/F. | $Q_{ave}$ btu/hr |
|---|---|---|---|
| DT = $T_{wall\ ave}$ − $T_{air\ in}$ = 50° F. | | $k_{air}$ = .0157 btu/hr/ft/F. | |
| 20000 | 68.7 | 216 | 1156 |
| 30000 | 92.3 | 290 | 1552 |
| 40000 | 113.7 | 357 | 1910 |
| 50000 | 133.7 | 420 | 2247 |
| DT = $T_{wall\ ave}$ − $T_{air\ in}$ = 100° F. | | $k_{air}$ = .0162 btu/hr/ft/F. | |
| 20000 | 68.7 | 223 | 2386 |
| 30000 | 92.3 | 299 | 3199 |
| 40000 | 113.7 | 368 | 3938 |
| 50000 | 133.7 | 433 | 4633 |
| DT = $T_{wall\ ave}$ − $T_{air\ in}$ = 150° F. | | $k_{air}$ = .0168 btu/hr/ft/F. | |
| 20000 | 68.7 | 231 | 3708 |
| 30000 | 92.3 | 310 | 4976 |
| 40000 | 113.7 | 382 | 6131 |
| 50000 | 133.7 | 449 | 7207 |

Test Unit Results

Tables 3 and 4 present the test data for the baseline 70, and zig-zag 52 panels, respectively. In these tables, the air outlet temperature is the average of the three exit thermocouples, the wall average temperature is the average of the two metal surface thermocouples, the $DT_f$ is the fluid temperature difference between inlet and average outlet, and the power is the total supplied to the heater.

TABLE 3

Straight Channel panel 70 (Baseline)
$P_{atm}$ = 14.54 psia
$T_{atm}$ = 72° F.

| $T_{air\ in}$ (F) | $T_{air\ out\ ave}$ (F) | $DT_f$ (F) | $T_{wallave}$ (F) | $P_{air\ in}$ (psig) | $P_{air\ out}$ (psig) | $DP_f$ (psid) | Power (btu/hr) |
|---|---|---|---|---|---|---|---|
| $Re_{jet}$ = 22620 | | | | | | | |
| 70 | 87 | 17 | 125.5 | 48.15 | 46.66 | 1.49 | 1721 |
| 70 | 98 | 28 | 161.0 | 48.39 | 46.98 | 1.41 | 2773 |
| 71 | 117 | 46 | 225.0 | 48.34 | 46.94 | 1.40 | 4616 |
| $Re_{jet}$ = 31900 | | | | | | | |
| 70 | 82 | 12 | 117.5 | 48.38 | 45.31 | 3.07 | 1704 |
| 71 | 90 | 19 | 147.5 | 48.53 | 45.51 | 3.02 | 2786 |
| 71 | 103 | 32 | 194.5 | 48.48 | 45.39 | 3.09 | 4514 |
| $Re_{jet}$ = 41640 | | | | | | | |
| 69 | 78 | 9 | 108.5 | 48.25 | 42.78 | 5.47 | 1711 |
| 69 | 84 | 15 | 135.5 | 48.19 | 42.71 | 5.48 | 2803 |
| 70 | 94 | 24 | 177.5 | 48.29 | 42.81 | 5.48 | 4517 |

TABLE 4

Zig-Zag panel Unit 52
$P_{atm}$ = 14.79 psia
$T_{atm}$ = 71° F.

| $T_{air\ in}$ (F) | $T_{air\ out\ ave}$ (F) | $DT_f$ (F) | $T_{wallave}$ (F) | $P_{air\ in}$ (psig) | $P_{air\ out}$ (psig) | $DP_f$ (psid) | Power (btu/hr) |
|---|---|---|---|---|---|---|---|
| $Re_{jet}$ = 22670 | | | | | | | |
| 69 | 87 | 18 | 125.0 | 48.20 | 46.66 | 1.54 | 1722 |
| 71 | 100 | 29 | 160.5 | 48.28 | 46.69 | 1.59 | 2763 |
| 73 | 120 | 47 | 219.0 | 48.20 | 46.59 | 1.61 | 4531 |
| $Re_{jet}$ = 32300 | | | | | | | |
| 66 | 79 | 13 | 114.0 | 48.50 | 45.19 | 3.31 | 1712 |
| 66 | 86 | 20 | 141.5 | 48.84 | 45.56 | 3.28 | 2756 |
| 66 | 99 | 33 | 184.5 | 48.81 | 45.53 | 3.28 | 4473 |
| $Re_{jet}$ = 41720 | | | | | | | |
| 67 | 77 | 10 | 106.0 | 48.23 | 42.50 | 5.73 | 1728 |
| 66 | 82 | 16 | 129.5 | 48.19 | 42.44 | 5.75 | 2774 |
| 65 | 91 | 26 | 165.5 | 48.21 | 42.44 | 5.77 | 4439 |

The test conditions for the two units were very close. A comparison of the results shows that any improvement represented by the zig-zag panel 52 over the baseline panel 70 is very small, in fact well within the limits of experimental uncertainty. There appears to be a consistent increase in pressure drop in going from the baseline to the zig-zag panels, but this is also within uncertainty limits.

To further compare these results to the parallel plate correlation presented above, the heat loss of the units to the surroundings was determined. One unit was heated at three different power levels for several hours to determine its steady temperature for each power supply/loss. The heat loss is summarized as

| $T_{wall}$ (F.) | $T_{wall}$ − $T_{atm}$ (F.) | $Q_{loss}$ (btu/hr) |
|---|---|---|
| 99 | 28 | 35 |
| 137 | 66 | 68 |
| 168 | 97 | 103 |

These losses are removed from the total power input for the appropriate unit temperature level.

Two cases are compared below, high Re of about 41700 with high heat rate, and low Re of about 22650 with high heat rate. Here $h_{ave}$ is determined using the wall average-to-fluid average temperature potential (average of fluid inlet and exit).

| Re | h of Eq.(1) (btulhr/ft2/F.) | Baseline 70 $h_{ave}$ | Zig-Zag 52 $h_{ave}$ |
|---|---|---|---|
| 22650 | 262 | 320 | 335 |
| 41700 | 393 | 432 | 463 |

From this comparison the impingement panel (52, 70) heat transfer performance is about 22–28% greater at the low Re and about 10–18% greater at the high Re, over the better plain impingement case of in-line jets.

Conclusions

Comparing the impingement panel 52, 70 overall heat transfer performance to that of plain impingement, for the same jet array geometries and on the basis of average fluid temperature, improvements on the order of 10–30% have been seen.

Comparing the baseline straight impingement channel to the zig-zag serpentine impingement panel 52 the small improvement in overall heat transfer performance of the latter is within experimental uncertainty limits. Also, the small increase in pressure drop with the zig-zag panel 52 is within measurement accuracies, but consistent with an increase in heat transfer.

The increase in heat transfer noted in above, represents a significant improvement, prior to any considerations of fabrication or cost. The addition of channels allows direction and distribution of the fluid amongst the channels. This also increases the available internal heat transfer surface area, but may as well increase pressure loss. Aside from many configuration parameters, the presence of the channel ribs must overcome the fact that they take away prime heat transfer surface area from the impingement surface. Increase of internal surface area and internal heat transfer coefficients through the use of channel walls, must be accompanied by effective energy transfer from the hot wall into the ribs. Materials play a great role in this effect. The stainless steel of the present tests is of low thermal conductivity, similar to superalloys, and does not get energy into the channel ribs well. Thermal gradients are an associated concern. Higher conductivity materials such as NiAl, with 2 to 4 times the conductivity, have been shown computationally to be of great benefit in thermal performance for similar designs to the present channels.

The present test cases represent only a start of the possible geometric configurations (fluid and structure). Optimization of the parameters may result in significantly greater heat transfer performance.

The above test report for the two unit sections fabricated, a baseline straight channel panel 70 and a serpentine zig-zag channel panel 52, both with impingement in the channels concludes that a fairly significant enhancement in overall heat transfer is seen with either of these units when compared to plain jet array impingement between parallel plates. However, the results of the two unit configurations are within experimental uncertainty limits when compared to each other. Because enhancements on the order of 10–30% or more may be realized over plain impingement, it would be worthwhile to pursue investigation into some form(s) of similar cooling geometries.

EXAMPLE 3 (made but not tested)

A plate preform 40 about 1½ inch×about 7½ inch was made from an about 0.04 inch thick HA214 top 42 and bottom faces 44, about 0.005 inch thick 304 stainless steel foil separations 46, and an about 0.2 inch thick inner core comprised of 304 stainless steel U-channels 48 around sacrificial monel pieces 50. A cross-section of the plate 40 is shown in FIG. 2. The channels and monel pieces ran continuously down the length of the plate. The channels were zig-zagged, a concept designed to enhance heat transfer of a structure by increasing turbulation. The plate was canned and then HIP'ed at about 1150° C./for about 4 hours/at about 15 ksi. After HIP'ing, the plate 40 was heated to about 950° C. and then hot-rolled, for a total reduction of about seventy five percent (75%). An about twenty-four (24) inch long section of the piece was then cold hoop-rolled to about 7½ inch diameter. The ring was etched in a hot solution of about forty five percent (45%) nitric acid/about five percent (5%) sulfuric acid/about fifty percent (50%) water, which removed the plain carbon steel HIP can as well as the sacrificial monel pieces 50 within the U-channels.

Figure 3A:
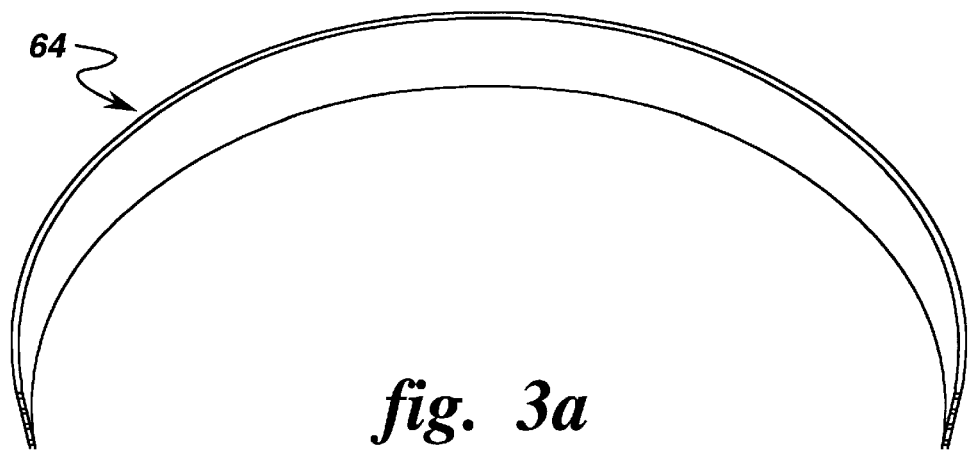
FIG. 3a is a Macro-view of the full ring-rolled structure made in accordance with one method of the present invention.
Figure 3B:
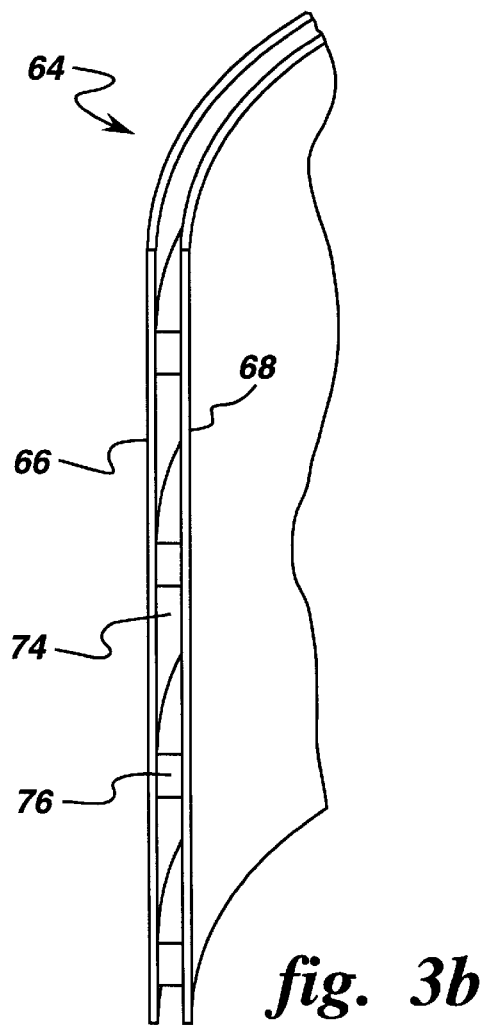
FIG. 3b is a Macro-view of the cross-section of the full ring-rolled structure of FIG. 3a made in accordance with one method of the present invention.

Removal of the monel left a double-walled structure 64 with about 0.011 inch thick HA214 walls 66, 68 separated by about 0.05 inch high cooling cavities 74 and internal 304 stainless steel partitions 76, as shown in FIG. 3b. Some opening up of the rolled ring occurred, due to partial relaxation of the cold work as the steel can was etched away. This could be avoided by constraining and stress-relieving the piece before etching.

The above described method could be used to fabricate structures, such as combustors and transition pieces for use in gas turbines and could possibly be made using different materials, such as a stronger alloy as the outer walls. If foils of high-strength superalloys are not available, the top and bottom faces of the preform could be made using in-process HIP consolidation of superalloy powders. Depending on the types of materials used, the structure could be ring-rolled hot, instead of cold.

The above methods of making cylindrical structures with cooling channels, such as, for example, combustor/transition pieces for gas turbines having a double wall with a plurality of cooling channels could be used to make axial and/or circumferential cross-flow passages positioned between the structure's inner member and the outer member to provide cooling air thereto. The cooling channels are formed in the area between the inner member of the structure and the outer member thereof. The passages preferably extend axially and/or circumferentially with respect to the direction of flow through the structure. The axial passages extend completely from one end to the other and the circumferential passages extend around the circumference of the structure.

The methods described herein can also be used to fabricate structures with internal features, serpentine passages of simple or high complexity, walls of variable thickness, accessibility to include flow inlets and exits where desired, and even 3D channels to follow the required structure dictated by aerodynamics. The examples show this technique can be applied to produce structures with enhanced cooling for application, such as for gas turbines, but the same approach could be used to fabricate reduced-weight components for aircraft engine applications, such as two-layer or multi-layer structures to replace solid components.

While the methods contained herein constitute preferred embodiments of the invention, it is to be understood that the invention is not limited to these precise methods, and that changes may be made therein without departing from the scope of the invention which is defined in the appended claims.

What is claimed is:

1. A method for making double-wall structures having integral internal channels, comprising:

assembling a double-wall assembly comprising an inner wall, channel forming means, sacrificial channel filling means and an outer wall, wherein the inner wall and the outer wall are complementary to one another and separated by the channel forming means that is placed between and in touching contact with them to define at least one channel, and wherein the sacrificial channel filling means is complementary to the channel forming means and placed into the channel forming means to fill the at least one channel, such that the double-wall assembly comprises a substantially solid structure;

wherein the assembling the at least one channel further comprises forming at least one stepwise offset for promoting turbulent fluid flow through the at least one channel;

hot pressing the double-wall assembly at a temperature and for a time sufficient to cause the inner wall, outer wall and channel forming means to become metallurgically bonded to one another; and removing the sacrificial channel filling means.

2. The method of claim 1, further comprising selecting a material comprising the outer wall from the group consisting of:

stainless steel, Ni-base alloys, Co-base alloys, Fe-base alloys, Ti-base alloys, Cr-base or composite alloys, FeCrAlY-W alloys and Nb-base alloys.

3. The method of claim 1 further comprising selecting a material comprising the inner wall from the group consisting of:

stainless steel, Ni-base alloys, Co-base alloys, Fe-base alloys, Ti-base alloys, Cr-base or composite alloys, FeCrAlY-W alloys and Nb-base alloys.

4. The method of claim 1, further comprising selecting a material comprising the channel forming means from the group consisting of:

stainless steels, Ni-base alloys, Co-base alloys, Fe-base alloys, Ti-base alloys and Nb-base alloys.

5. The method of claim 1, further comprising selecting a material comprising the channel filling means from the group consisting of:

alloys comprising Ni and Cu, graphite, carbon steel, carbonaceous materials, and at least one of a glass and a salt that might be solid at the hot pressing and etched afterward.

6. The method of claim 1, wherein hot pressing further comprises:

hot isostatic pressing.

7. The method of claim 6, further comprising:

canning the double-wall assembly and evacuating the canned assembly prior to the hot pressing.

8. The method of claim 1, wherein the hot pressing further comprises:

powder compaction.

9. The method of claim 1, wherein removing the channel filling means comprises selecting a removal method from the group consisting of:

chemical etching of the channel filling means, pyrolysis of the channel filling means, melting of the channel filling means, expulsion of the melt and dissolution of the channel filling means in a liquid not aggressive with respect to wall channel materials.

10. The method of claim 1, further comprising selecting a material comprising the outer wall prepared by means selected from the group consisting of:

casting, wrought and powder metallurgy techniques.

11. The method of claim 1, further comprising selecting a material comprising the inner wall prepared by means selected from the group consisting of:

casting, wrought and powder metallurgy techniques.

12. The method of claim 1, further comprising selecting a material comprising the channel forming means prepared by means selected from the group consisting of:

casting, wrought and powder metallurgy techniques.

13. The method of claim 1, wherein assembling the channel forming means further comprises:

selecting a single article having at least one channel formed therein.

14. The method of claim 13, further comprising providing the at least one channel comprising at least one stepwise offset for promoting turbulent fluid flow through the channel.

15. The method of claim 1, wherein the assembling the channel forming means comprises:

selecting a plurality of components that communicate with one another to form the at least one channel.

16. The method of claim 1, further comprising:

creating a plurality of bores that extend through the inner wall into the at least one channel prior to the assembling the double-wall assembly, wherein the double-wall assembly also comprises bore filling means that is inserted into the bore during the assembling.

17. The method of claim 1, further comprising:

creating a plurality of bores that extend through the inner wall into the at least one channel after the hot pressing and prior to the removing the channel filling means.

18. The method of claim 1, further comprising:

creating a plurality of bores that extend through the inner wall into the at least one channel after said removing of the channel filling means.

19. A method for making double-wall structures having integral internal channels, comprising:

assembling a double-wall assembly comprising an inner wall, channel forming means, sacrificial channel filling means and an outer wall, wherein the inner wall and the outer wall are complementary to one another and separated by the channel forming means that is placed between and in touching contact with them to define at least one channel, and wherein the sacrificial channel filling means is complementary to the channel forming means and placed into the channel forming means to fill the at least one channel, such that the double-wall assembly comprises a substantially solid structure;

hot pressing the double-wall assembly at a temperature and for a time sufficient to cause the inner wall, outer wall and channel forming means to become metallurgically bonded to one another;

creating a plurality of bores that extend through the inner wall into the at least one channel; and removing the sacrificial channel filling means.

20. The method of claim 19, further comprising selecting a material comprising the outer wall from the group consisting of:

stainless steel, Ni-base alloys, Co-base alloys, Fe-base alloys, Ti-base alloys, Cr-base or composite alloys, FeCrAlY-W alloys and Nb-base alloys.

21. The method of claim 19, further comprising selecting a material comprising the inner wall from the group consisting of:

stainless steel, Ni-base alloys, Co-base alloys, Fe-base alloys, Ti-base alloys, Cr-base or composite alloys, FeCrAlY-W alloys and Nb-base alloys.

22. The method of claim 19, further comprising selecting a material comprising the channel forming means from the group consisting of:

stainless steels, Ni-base alloys, Co-base alloys, Fe-base alloys, Ti-base alloys and Nb-base alloys.

23. The method of claim 19, further comprising selecting a material comprising the channel filling means from the group consisting of:

alloys comprising Ni and Cu, graphite, carbon steel, carbonaceous materials, and at least one of a glass and a salt that might be solid at the hot pressing temperature and etched afterward.

24. The method of claim 19, wherein hot pressing further comprises:

hot isostatic pressing.

25. The method of claim 24, further comprising canning the double-wall assembly and evacuating the canned assembly prior to the hot pressing.

26. The method of claim 19, wherein the hot pressing further comprises:

powder compaction.

27. The method of claim 19, wherein removing the channel filling means comprises selecting a removal method from the group consisting of:

chemical etching of the channel filling means, pyrolysis of the channel filling means, melting of the channel filling means, expulsion of the melt and dissolution of the channel filling means in a liquid not aggressive with respect to wall channel materials.

28. The method of claim 19, further comprising selecting a material comprising the outer wall prepared by means selected from the group consisting of:

casting, wrought and powder metallurgy techniques.

29. The method of claim 19, further comprising selecting a material comprising the inner wall prepared by means selected from the group consisting of:

casting, wrought and powder metallurgy techniques.

30. The method of claim 19, further comprising selecting a material comprising the channel forming means prepared by means selected from the group consisting of:

casting, wrought and powder metallurgy techniques.

31. The method of claim 19, wherein assembling the channel forming means further comprises:

selecting a single article having at least one channel formed therein.

32. The method of claim 31, further comprising providing the at least one channel comprising at least one stepwise offset for promoting turbulent fluid flow through the channel.

33. The method of claim 19, wherein the assembling the channel forming means comprises:

selecting a plurality of components that communicate with one another to form the at least one channel.

34. The method of claim 19, wherein the assembling the at least one channel further comprises forming at least one stepwise offset for promoting turbulent fluid flow through the at least one channel.

35. The method of claim 19, the creating a plurality of bores that extend through the inner wall into the at least one channel further comprising creating the plurality of bores prior to the assembling the double-wall assembly, wherein the double-wall assembly also comprises bore filling means that is inserted into the bore during the assembling.

36. The method of claim 19, the creating a plurality of bores that extend through the inner wall into the at least one channel further comprising creating the plurality of bores after the hot pressing and prior to the removing the channel filling means.

37. The method of claim 19, the creating a plurality of bores that extend through the inner wall into the at least one channel further comprising creating the plurality of bores after said removing of the channel filling means.

* * * * *